United States Patent Office 2,941,969
Patented June 21, 1960

2,941,969
COPOLYMER OF A QUATERNARY AMMONIUM COMPOUND AND ACRYLONITRILE, SOLUTION THEREOF, AND FIBER FORMED THEREFROM

John A. Price, Stamford, Conn., assignor to American Cyanamid Company, New York, N.Y., a corporation of Maine No Drawing. Filed Aug. 26, 1954, Ser. No. 452,441

11 Claims. (Cl. 260—29.6)

This invention relates to copolymers of unsaturated quaternary compounds, and more particularly to copolymers of acrylonitrile and a particular kind of unsaturated quaternary ammonium compound. The scope of the invention also includes method features.

More particularly the present invention is directed to the production of copolymers from a class of quaternary ammonium compounds embraced by the general formula

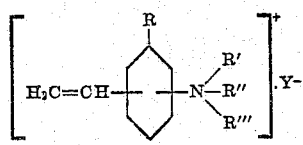

wherein R represents a member of the class consisting of hydrogen and the methyl radical, R' and R'' each represents an alkyl radical containing from 1 to 5 carbon atoms, inclusive, R''' represents a radical of the class consisting of alkyl, alkenyl, hydroxyalkyl and aralkyl radicals, and Y⁻ represents an anion. My invention embraces polymerizable compositions comprising (1) a compound of the class covered by Formula I and (2) a compound which is different from the compound of (1), which is copolymerizable therewith and which contains a $CH_2=C<$ grouping, specifically acrylonitrile; as well as products comprising the polymerized composition just described.

Illustrative examples of alkyl radicals represented by R' and R'' in the above formula, and which may be the same or different, are methyl, ethyl, propyl, isopropyl, butyl, isobutyl, sec.-butyl, tert.-butyl, amyl, isoamyl, etc. Examples of alkyl radicals represented by R''' in the above formula are the same as those just mentioned with reference to R' and R'', and, in addition, hexyl to octadecyl, inclusive. Illustrative examples of aralkyl and hydroxyalkyl radicals represented by R''' are benzyl, phenylethyl, phenylpropyl, phenylisopropyl, etc., and hydroxy (monohydroxy)-ethyl, -propyl, -isopropyl, -n-butyl, -isobutyl, -sec.-butyl, -tert.-butyl, -amyl, -hexyl, -heptyl, -octyl, -nonyl, and -decyl to -octadecyl, inclusive. Illustrative examples of alkenyl radicals represented by R''' are allyl, methallyl, ethallyl, propallyl, 2-butenyl, 3-butenyl, 3-methyl-2-butenyl, 3-methyl-3-butenyl, 2-pentenyl, 4-pentenyl, 2-methyl-2-pentenyl, 3-methyl-4-pentenyl, 2-hexenyl, 2,3-pentadienyl, 2,4-hexadienyl, 2-octenyl, 3-nonenyl, 2-decenyl, etc.

Illustrative examples of anions represented by Y⁻ in Formula I are the chloride, bromide, iodide, sulfate, sulfonate, phosphate, hydroxide, borate, cyanide, carbonate, hydrocarbonate, thiocyanate, thiosulfate, isocyanate, sulfite, bisulfite, nitrate, nitrite, oxalate, silicate, sulfide, cyanate, acetate and the other common inorganic and organic anions.

More specific examples of quaternary ammonium compounds embraced by Formula I are salts represented by the formulas

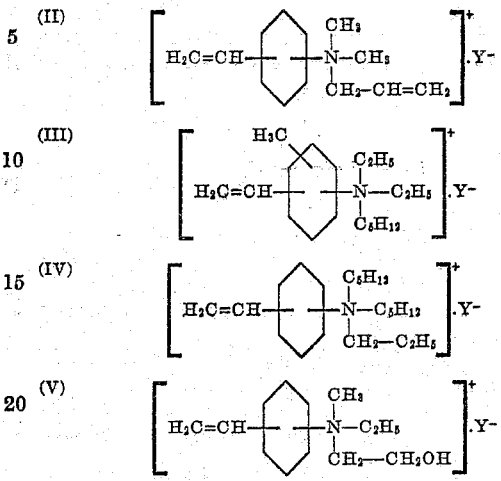

wherein, in each of the above formulas, Y⁻ represents an anion, numerous examples of which have been given hereinbefore. Other examples include:

Methallyl dimethyl o-vinylphenyl ammonium chloride
Octyl diethyl m-vinylphenyl ammonium phosphate
β-Hydroxyethyl dipropyl p-vinylphenyl ammonium bromide
Benzyl dimethyl 2-methyl-5-vinylphenyl ammonium phosphate
3-hydroxypropyl diethyl vinylphenyl ammonium sulfates
Octadecyl dimethyl vinylphenyl ammonium sulfonates
Amyl dimethyl 3-methyl-5-vinylphenyl ammonium thiocyanate Other examples will be apparent to those skilled in the art from Formula I and from the illustrative examples hereinbefore given of radicals represented by R', R'' and R''', and of anions represented by Y⁻.

It is an object of the present invention to provide a new class of polymerizable compositions containing (1) a compound of the kind embraced by Formula I (or a plurality of such compounds) and (2) one or more other comonomers copolymerizable therewith, and a new class of copolymer compositions from the said polymerizable compositions.

Another object of the invention is to provide a new class of synthetic compositions, more particularly resinous copolymers, which are especially suitable for use in the plastics, coating, adhesive, laminating, molding and other arts.

Another object of the invention is the production of new copolymers, more particularly new acrylonitrile copolymer compositions, which are more readily dyed, especially with acid dyes, than homopolymeric acrylonitrile or many of the copolymers of acrylonitrile and another monomer or monomers that were known or suggested prior to my invention.

Another object of the invention is to prepare such acrylonitrile copolymers which can be spun or otherwise shaped to form filaments, tapes, ribbons, tubes, rods, sheets, etc., and the shaped articles then dyed either before or after having been oriented or treated to improve their useful properties.

Still other objects of the invention will be apparent to those skilled in the art from the description and examples which follow.

The polymerization product advantageously is prepared by polymerizing the polymerizable substance including the aforementioned unsaturated quaternary ammonium compound in an aqueous medium with the aid of a polymerization catalyst, and recovering the resulting polymeric product by any suitable means, e.g., by filtration, centrifuging, etc.

Any suitable method can be used in preparing the quaternary ammonium compounds embraced by Formula I and which are used in producing the copolymeric compositions. They can be prepared, for example, by quaternizing a compound represented by the general formula (VI)
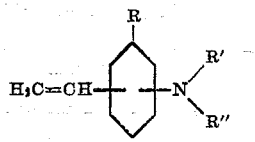

wherein R, R' and R'' each has the same meaning given hereinbefore with reference to Formula I. Any suitable quaternizing agent can be used in preparing the quaternary ammonium compound from the aforementioned intermediate. Examples of such quaternizing agents are the alkyl and alkenyl halides (e.g., methyl, ethyl, butyl, octyl, decyl, lauryl, octadecyl, allyl, methallyl, etc., chlorides, bromides, etc.), alkyl sulfates such as the dimethyl, diethyl, dipropyl, dibutyl, diisobutyl, dioctyl, dilauryl, etc., sulfates, alkyl aryl sulfonates such as butyl benzene sulfonate, butyl toluene sulfonate, ethyl toluene sulfonate, octyl benzene sulfonate, etc.

A general procedure for the preparation of the quaternary ammonium compounds used in practicing the present invention, and which is given for purpose of illustration only, is as follows: Approximately equivalent amounts of, for example, a hydrocarbon halide, specifically the chloride or bromide, and an aminostyrene of the kind embraced by Formula VI are mixed in a reaction vessel together with an equal volume of an inert diluent or reaction medium, e.g., benzene. The reaction temperature varies in specific cases between, for example, 25° C. and 100° C. The time of reaction also varies in specific cases from, for instance, 0.5 to 10 hours. The precipitated quaternary ammonium compound is then isolated, as by filtration through a Büchner funnel, washed thoroughly with fresh benzene or other suitable solvent for any unreacted material, and dried, for instance under a vacuum in a desiccator.

The free quaternary ammonium base can be prepared from any of the hereindescribed quaternary ammonium salts of inorganic acids by treating a water-free solution of the salt, for instance the chloride, in n-butanol (or isopropanol or tert.-butanol) with a slight excess of the sodium salt of the alcohol used. After cooling and standing for about 16 hours, the crystalline sodium salt of the inorganic acid is filtered from the solution of quaternary ammonium alkoxide. Water is added to the mixture to yield the quaternary ammonium hydroxide.

Any suitable means may be used in effecting polymerization of the quaternary compound admixed with one or more other substances which are copolymerizable therewith. Heat, light, or both heat and light, with or without a polymerization catalyst can be used. A polymerization catalyst preferably is employed in order to shorten the period of time required for polymerization.

Any of the polymerization catalysts which are suitable for use in polymerizing compounds containing an ethylenically unsaturated grouping, specifically a vinyl grouping, can be employed. Among such catalysts are the various organic peroxy catalysts, illustrative examples of which latter are: the dialkyl peroxides, e.g., diethyl peroxide, dipropyl peroxide, dibutyl peroxide, dilauryl peroxide, dioleyl peroxide, distearyl peroxide, di-(tert.-butyl) peroxide and di-(tert.-amyl) peroxide; the alkyl hydrogen peroxides, e.g., tert.-butyl hydrogen peroxide (tert.-butyl hydroperoxide), tert.-amyl hydrogen peroxide (tert.-amyl hydroperoxide), etc.; symmetrical diacyl peroxides, for instance peroxides which commonly are known under such names as acetyl peroxide, propionyl peroxide, lauroyl peroxide, stearoyl peroxide, malonyl peroxide, succinyl peroxide, phthaloyl peroxide, benzoyl peroxide, etc.; fatty oil acid peroxides, e.g., coconut oil acid peroxides, etc.; unsymmetrical or mixed diacyl peroxides, e.g., acetyl benzoyl peroxide, propionyl benzoyl peroxide, etc.; terpene oxides, e.g., ascaridole, etc.; and salts of inorganic per-compounds, examples of which are given hereinafter. Other so-called "free radical" types of catalysts, e.g., $\alpha,\alpha'$-azodiisobutyronitrile, also can be used to accelerate polymerization. The various known "redox" (reduction-oxidation) catalyst systems also can be employed, and are especially adapted for use when the polymerizable substance (monomer admixed with another polymerizable substance) is polymerized in an aqueous medium. Such water-soluble catalyst systems generally comprise a water-soluble catalyst or catalysts and a water-soluble activator. Illustrative examples of water-soluble catalysts are water-soluble, oxygen-yielding peroxy compounds, e.g., the water-soluble peroxides, peracids and persalts, including hydrogen peroxide, organic peroxides, e.g., diacetyl peroxide, urea peroxide, etc., peracetic acid, the various water-soluble perchlorates, persulfates, percarbonates, perborates, perphosphates, etc., e.g., the ammonium and alkali-metal (sodium, potassium, lithium, etc.) salts of percarbonic, peracetic, perboric, perphosphoric, persulfuric, perchloric, etc., acids; water-soluble chlorates, e.g., ammonium, sodium and potassium chlorates, etc.; water-soluble ferric salts capable of yielding ferric ions, including the various ferric alums, e.g., ferric ammonium sulfate (ferric ammonium alum), ferric sodium sulfate, ferric potassium sulfate, etc. Other examples of water-soluble additives comprising a water-soluble catalyst that may be used in producing the copolymers of the present invention are given in, for instance, U.S. Patents 2,289,540, 2,380,474, -5, -6, -7, 2,380,617, -8, 2,380,710, 2,383,425, 2,384,544, 2,384,571, 2,384,574, 2,388,373 and 2,395,017.

Illustrative examples of water-soluble activators (water-soluble polymerization adjuvants) of the catalyst are oxygen-containing sulfur compounds which are capable of undergoing oxidation for instance sulfur dioxide, the alkali-metal (e.g., sodium, potassium, etc.) bisulfites, hydrosulfites, thiosulfates, sulfurous acid (or compounds which engender sulfurous acid, e.g., alkali-metal sulfites, ethyl and other alkyl sulfites, etc.), various organic sulfinic acids, e.g., p-toluene sulfinic acid, formamide sulfinic acid, etc. If alkali-metal sulfites, e.g., sodium sulfite, or similar compounds which engender sulfurous acid are used, the aqueous solution also should contain a strong acid, e.g., sulfuric acid, etc., in an amount which is at least chemically equivalent to the amount of such a compound engendering sulfurous acid that is employed.

If desired, the polymerizable substance can be polymerized in emulsion or in solution state to yield a polymer. Good results are obtained by effecting polymerization while the polymerizable material is dissolved in a suitable solvent, preferably water or a liquid solvent comprising mainly water. Suitable inert organic solvents can be used if desired, e.g., benzene, toluene, xylene, etc. Preferably the polymerization reaction is carried out in a liquid medium in which the polymerizable substance is soluble but the polymer is insoluble, e.g., water.

The polymerization also can be effected by conventional bulk polymerization technique, in the presence or absence of a solvent capable of dissolving the polymerizable material and in which the latter preferably is inert; or by conventional bead polymerization methods. The polymerization of the polymerizable substance can be effected by a continuous process as well as by a batch operation.

The concentration of the catalyst is relatively small, e.g., from, by weight, about 1 part of catalyst per 1,000 parts of the polymerizable material to about 4 or 5 parts of catalyst per 100 parts of the said material. The amount of polymerization adjuvant or activator used likewise may be varied considerably, but generally is within the range of from about 0.1 to 1 molar proportion based on the catalyst used or an amount which is chemically equivalent to the amount of catalyst employed. The use of higher ratios of activator with respect to the catalyst is not precluded, e.g., 2 or 3 or more moles of activator per mole of catalyst, or correspondingly larger proportions on a chemical equivalent basis, but no particular advantages ordinarily accrue therefrom.

Forms of radiation other than ultraviolet or visible light may also be used to initiate polymerization. Examples of such types of radiation are high-energy particles (e.g., high-energy electrons), X-rays and gamma radiation. Cobalt-60 is a convenient source of gamma radiation. In all of these cases polymerization may be initiated either by direct effect of radiation on the polymerizable substance or indirectly (if a solvent or other substance is present) by the action of radicals resulting from irradiation of these substances.

The polymerization reaction may be effected, if desired, while the aqueous medium is maintained under an atmosphere of an inert gas, for example nitrogen, helium, carbon dioxide, etc.; or, it may be (but preferably is not) carried out under an atmosphere of air.

The temperature at which the polymerizable material is polymerized can be varied over a wide range, up to and including or slightly above the boiling point (at atmospheric pressure) of the mixture of polymerizable substances. In most cases, the polymerization temperature will be within the range of about 20° or 30° C., preferably at least 35° or 40° C., up to the boiling temperature of the polymerizable material, depending, for example, upon the particular catalyst, if any, used, the rapidity of polymerization wanted and other influencing factors. The use of polymerization temperatures substantially above the boiling point of the mixture of polymerizable substances is not precluded, but generally is less desirable because the polymerization reaction then must either be carried out in a closed reaction vessel under pressure, or, for economical reasons, with a reflux condenser or other means provided for the recovery and re-use of the volatilized monomers if the reaction is carried out at the boiling temperature of the mass under atmospheric pressure.

The polymers of this invention can be produced in various molecular weights as desired or as conditions may require. Thus, the fiber-forming copolymers, more particularly the fiber-forming acrylonitrile copolymers, ordinarily are within the range of about 15,000 to about 300,000 or higher as calculated from viscosity measurements using the Staudinger equation (reference: U.S. Patent No. 2,404,713). Homogeneous acrylonitrile copolymers having an average molecular weight of between about 60,000 and 90,000 and which contain at least 70%, advantageously from about 80% to about 95% of acrylonitrile (combined acrylonitrile) in the molecule, are especially suitable for use in making dyeable, oriented fibers by wet- or dry-spinning methods.

If the polymerization reaction is carried out while the polymerizable material is dissolved or dispersed in a liquid medium, e.g., in solution in water, the resulting polymer then is separated from the said medium by any suitable means, e.g., by filtration, centrifuging, solvent extraction, etc.

The quarternary ammonium compound may be used alone in various detergent, germicidal, fungicidal, antistatic, plastics, and other applications. The homopolymer is also useful in many applications, e.g., as a modifier of a polymer of acrylonitrile to improve its dyeability, especially with acid dyes. Or, in order to modify the properties of the quarternary ammonium compound and to widen the field of utility, it can be copolymerized with other substances which are different therefrom and copolymerizable therewith, e.g., compounds containing a $CH_2=C<$ grouping which are different from the quarternary compound, unsaturated alkyd resins, mixtures of individual members of either or both of these classes of polymerizable unsaturated materials, as well as other copolymerizable substances.

Illustrative examples of substances that can be copolymerized with a quaternary ammonium compound of the kind embraced by Formula I are vinyl compounds, including the vinyl and isopropenyl aromatic compounds, more particularly the vinyl and isopropenyl aromatic hydrocarbons (e.g., styrene, isopropenyl toluene, the various dialkyl styrenes, etc.), other aliphatic compounds containing a $CH_2=C<$ grouping, e.g., acrylonitrile and the various substituted acrylonitriles (e.g., methacrylonitrile, ethacrylonitrile, phenylacrylonitrile, etc.), the various acrylamides (e.g., acrylamide itself, methacrylamide, ethacrylamide, the N-monoalkyl and -dialkyl acrylamides and methacrylamides, e.g., N-monomethyl, -ethyl, -propyl, -butyl, etc., and N-dimethyl, -ethyl, -propyl, -butyl, etc., acrylamides and methacrylamides, N-monoaryl and -diaryl acrylamides and alkacrylamides, e.g., N-monophenyl and -diphenyl acrylamides and methacrylamides, the various N-β-hydroxyethyl acrylamides, etc.), vinyl esters, e.g., vinyl acetate, vinyl propionate, vinyl butyrate, vinyl isobutyrate, vinyl valerate, vinyl acrylate, vinyl methacrylate, etc., esters of an acrylic acid (including acrylic acid itself and the various alpha-substituted acrylic acids, e.g., methacrylic acid, ethacrylic acid, phenylacrylic acid, etc.), more particularly the alkyl esters of an acrylic acid, e.g., the ethyl, propyl, isopropyl, n-butyl, isobutyl, sec.-butyl, tert.-butyl, amyl, hexyl, heptyl, octyl, decyl, dodecyl, etc., esters of acrylic, methacrylic, ethacrylic, phenylacrylic, etc., acids including the alkyl acrylates containing not more than four carbon atoms in the alkyl grouping, examples of which are given above, as well as other vinyl aromatic and vinyl aliphatic compounds, and other compounds containing a $CH_2=C<$ grouping, more particularly a single $CH_2=C<$ grouping.

Other examples of copolymerizable substances that can be employed alone or in conjunction with one or more compounds containing a $CH_2=C<$ grouping include the polymerizable unsaturated alkyd resins (modified or unmodified), e.g., ethylene glycol maleate, diethylene glycol maleate phthalate, ethylene glycol maleate succinate and diethylene glycol maleate linoleate. Other and more specific examples of unsaturated alkyd resins that can be used are given, for example, in Nyquist and Kropa Patent No. 2,503,209, dated April 4, 1950, and patents referred to therein (see, for instance, column 8, lines 1–64).

Still other examples of materials that can be copolymerized with the quaternary ammonium compound of the kind embraced by Formula I are given in Kropa Patent No. 2,510,503 (e.g., column 2, line 46, to the end of the sentence in line 16, column 3; column 5, line 54, through line 46, column 7; and column 13, line 42, through line 30, column 16); and in the aforesaid Nyquist et al. Patent No. 2,503,209 (see, for instance, column 5, line 67, through line 75, column 7; and column 9, line 74, through line 12, column 11).

The proportions of the quarternary ammonium compound and unsaturated material which is copolymerizable therewith may be widely varied depending, for instance, upon the particular starting materials employed and the particular properties desired in the copolymer, e.g., in weight ratios of from 1:99 to 99:1, and more particularly from 5:95 to 95:5. Mainly for economical reasons, it is usually desirable that the quaternary ammonium compound does not exceed about 50% by weight of the total monomers. For example, I may use advantageously from about 2% to about 40% of the quaternary ammonium compound and from about 60% to about 98% of the other copolymerizable substance or substances, e.g., a different vinyl compound or compounds, and more specifically acrylonitrile, in producing new and valuable copolymer compositions. The percentages just mentioned are by weight.

My invention has particular utility in preparing improved acrylonitrile copolymers. In making such copolymers, the proportions of any modifying comonomer or comonomers that are incorporated in the polymerizable composition together with the acrylonitrile and quaternary ammonium compound of the kind embraced by Formula I can be varied as desired or as conditions may require. Ordinarily, however, the acrylonitrile constitutes a major or preponderant proportion (more than 50%) by weight of the total weight of monomers to be copolymerized, the quaternary ammonium compound constitutes from about 2 or 3% to about 15 or 20%, or in some cases as high as 25 or 30%, of the total weight of the acrylonitrile and quaternary ammonium compound, and any modifying comonomer or comonomers (if present in the polymerizable mixture) constitute the remainder of the total amount of copolymerizable ingredients which are subjected to copolymerization.

In the preferred acrylonitrile copolymer compositions (more particularly thermoplastic acrylonitrile copolymer compositions) of the present invention, the acrylonitrile is employed in the mixture of comonomers in an amount such that at least about 85% by weight of combined acrylonitrile is present in the copolymer.

The quaternary ammonium compounds embraced by Formula I are stable under conditions where the simple addition salt of the aminostyrenes that are quaternized to form the compounds of Formula I are unstable and liberate the free base, with obvious advantages in the commercial utilization of the compounds.

In order that those skilled in the art may better understand how the present invention can be carried into effect the following examples are given by way of illustration and not by way of limitation. All parts and percentages are by weight.

*Example 1*

To a reaction vessel are added 10 parts of dimethylaminostyrene (comprised mainly of p-dimethylaminostyrene but also containing lesser amounts of the ortho and meta isomers) and 34 parts of benzyl bromide. The solution is allowed to stand for a half hour, during which time a considerable amount of heat is evolved and the product separates. It is washed three times with 50 parts of benzene, collected on a Büchner funnel, and dried to a constant weight in a vacuum desiccator. The yield of light cream-colored benzyl dimethyl vinyphenyl ammonium bromide amounts to 20.9 parts.

*Example 2*

Fifteen (15) parts of dimethylaminostyrene of the same kind used in Example 1 and 15 parts of allyl bromide are added to a reaction vessel. After standing for two days at room temperature the product separates. It is washed, collected and dried in the same manner as in Example 1. The yield of tan-colored allyl dimethyl vinylphenyl ammonium bromide amounts to 27 parts.

*Example 3*

To a reaction vessel are added 10 parts of the same dimethylaminostyrene used in Example 1 and 25.3 parts of benzyl chloride, and the resulting solution is heated under reflux at the boiling temperature of the mass for 24 hours. At the end of this period of time the desired product, benzyl dimethyl vinylphenyl ammonium chloride, has separated. It is washed, collected and dried as in Example 1. The dried product, which is obtained in a yield approximating the theoretical, is polymerizable both alone and admixed with other comonomers.

*Example 4*

To a reaction vessel equipped with a stirrer, thermometer, Dry Ice-acetone reflux condenser and gas-inlet tube are added 147 parts of the same dimethylaminostyrene used in Example 1, 39.1 parts of sulfuric acid, 114 parts of water and 40 parts of isopropanol. The vessel is placed on a steam bath. Over a period of 2 hours, 44 parts of ethylene oxide (100% of the theoretical) is bubbled into the vessel beneath the surface of the solution at a temperature of 64°–79° C. The rate of addition is controlled by the amount of ethylene oxide that is refluxing. The addition of ethylene oxide is stopped and the solution is stirred for an additional hour at the same temperature. No refluxing of ethylene oxide is evident at the end of this period. The solution of the resulting 2-hydroxyethyl dimethyl vinylphenyl ammonium sulfate is then completely neutralized by the addition of sulfuric acid.

*Example 5*

To a reaction vessel are added 29.4 parts of the same dimethylaminostyrene used in Example 1 and 28 parts of n-butyl bromide. The solution is heated on a steam bath for 24 hours. The product is collected on a Büchner funnel, washed with 40 parts of benzene, and dried in a vacuum desiccator. A good yield of n-butyl dimethyl vinylphenyl ammonium bromide is obtained.

*Example 6*

This example illustrates the preparation of a homopolymer of benzyl dimethyl vinylphenyl ammonium chloride from a polymer of the same dimethylaminostyrene used in Example 1.

To a reaction vessel are added 10 parts of the dimethylaminostyrene and 0.2 part of alpha,alpha'-azodiisobutyronitrile. The solution is heated on a steam bath for 2 hours. An additional 0.1 part of alpha,alpha'-azodiisobutyronitrile is added, and heating is continued for another 2 hours. The resulting polymer is dissolved in 40 parts of benzene, re-precipitated in 250 parts of ethanol and dried in an oven at 70° C. for 4 hours. The yield of dry, cream-colored polymer of dimethylaminostyrene amounts to 7.5 parts.

A portion of this polymer (2.5 parts) is dissolved in 20 parts of benzene, treated with 6.4 parts of benzyl chloride and allowed to stand at room temperature for 3 days. The precipitated product is collected on a Büchner funnel, washed with 80 parts of benzene and dried to a constant weight in a vacuum desiccator. The yield of tan-colored homopolymeric benzyl dimethyl vinylphenyl ammonium chloride amounts to 3.8 parts.

*Example 7*

To a reaction vessel are added 2.5 parts of homopolymeric dimethylaminostyrene (prepared as described under Example 3), 20 parts of benzene and 6.2 parts of allyl bromide. After standing for 1 hour, the product that precipitates from the clear solution is collected on a Büchner funnel, washed with 80 parts of benzene and dried in a vacuum desiccator to a constant weight. The yield of tan-colored, homopolymeric allyl dimethyl vinylphenyl ammonium bromide amounts to 4.5 parts.

*Example 8*

This example illustrates the preparation of homopolymeric acrylonitrile, which is subsequently employed in comparative dye tests with some of the copolymers of the present invention.

A reaction vessel, equipped with a stirrer, reflux condenser, thermometer and gas-inlet tube, is placed in a constant-temperature bath which is maintained at 35° C. To the vessel is added a solution of 53.0 parts of acrylonitrile, 900 parts of distilled water and 0.29 part of sulfuric acid. The pH of the initial solution is 3.1. A rapid stream of pre-purified nitrogen is passed over the surface of the solution for 30 minutes. The nitrogen flow is then reduced to about one bubble per second. A reduction-oxidation catalyst system ("redox" system) consisting of 1.71 parts of ammonium persulfate and 0.71 part of sodium meta-bisulfite, each dissolved in 50 parts of water, is then added. The solution first becomes cloudy at the end of 3 minutes, and the polymerization is fairly exothermic for the first half hour. The polymerization is continued for a total of 4 hours at 35° C. The polymer is collected on a Büchner funnel, and washed with 1000 parts of distilled water followed by about 160 parts of methanol. The polymer is dried in an oven at 70° C. for about 16 hours. The yield of dry polyacrylonitrile, which is white, amounts to 48 parts.

The following examples illustrate the preparation of various copolymers of my invention.

Example 9

To a reaction vessel equipped as in Example 8 is added a solution of 47.7 parts of acrylonitrile, 5.3 parts of allyl dimethyl vinylphenyl ammonium bromide and 800 parts of water. A rapid stream of pre-purified nitrogen gas is passed over the surface of the solution for 30 minutes. The nitrogen flow is then reduced to about one bubble per second. A "redox" catalyst system is prepared by dissolving 1.71 parts of ammonium persulfate and 0.36 part of sodium meta-bisulfite, each in 100 parts of water. Portions of the catalyst solution are added at 25-minute intervals over a period of 2½ hours. The polymerization is continued for a total period of 5 hours at 35° C. The resulting copolymer is collected on a Büchner funnel, washed with 500 parts of water, and air-dried to a constant weight. The yield of tan-colored copolymer of acrylonitrile and allyl dimethyl vinylphenyl ammonium bromide amounts to 15 parts.

Example 10

A solution consisting of 5 parts of benzyl dimethyl vinylphenyl ammonium bromide, 20 parts of acrylonitrile, 0.25 part of ammonium persulfate and 200 parts of water is added to a reaction vessel equipped with a reflux condenser. The solution is heated on a steam bath for 1 hour. An additional 0.25 part of ammonium persulfate dissolved in 25 parts of water is added, and heating is continued on the steam bath for 17 hours. The product is collected on a Büchner funnel, washed with 500 parts of water, and dried in an oven at 70° C. to a constant weight. The yield of light cream-colored copolymer of acrylonitrile and benzyl dimethyl vinylphenyl ammonium bromide amounts to 14 parts.

Example 11

To a reaction vessel are added 9.0 parts of acrylonitrile, 0.5 part of methyl acrylate, 0.5 part of benzyl dimethyl vinylphenyl ammonium bromide, 90 parts of water and 0.05 part of ammonium persulfate. The solution is warmed on a steam bath for 2 hours. The precipitate is collected on a Büchner funnel, washed with 500 parts of water and dried in an oven at 70° C. for 4 hours. A good yield of a dry, white copolymer (more particularly tripolymer) of acrylonitrile, methyl acrylate and benzyl dimethyl vinylphenyl ammonium bromide is obtained.

Example 12

To a reaction vessel equipped as in Example 8 is added a solution of 95.4 parts of acrylonitrile, 10.6 parts of 2-hydroxyethyl dimethyl vinylphenyl ammonium sulfate, 800 parts of demineralized water and 0.59 part of sulfuric acid. The pH of the solution is 3.2. A rapid stream of pre-purified nitrogen gas is passed over the surface of the solution for 30 minutes. The nitrogen flow is then reduced to about one bubble per second. A reduction-oxidation catalyst system ("redox" system) is prepared by dissolving 1.71 parts of ammonium persulfate and 0.71 part of sodium meta-bisulfite, each in 100 parts of water. Portions of the catalyst solutions are added at 25-minute intervals over a period of 2.5 hours. The polymerization is continued for a total period of 5 hours at 35° C. The copolymer is collected on a Büchner funnel, washed with 2000 parts of water and dried in an oven at 70° C. for about 16 hours. A good yield of dry, white copolymer of acrylonitrile and 2-hydroxyethyl dimethyl vinylphenyl ammonium sulfate is obtained.

Example 13

To a reaction vessel are charged 9 parts of styrene, 1 part of benzyl dimethyl vinylphenyl ammonium bromide, 30 parts of water, 0.30 part of a cationic emulsifying agent, specifically gamma-stearamidopropyl dimethyl beta-hydroxyethyl ammonium chloride, and 0.10 part of alpha,alpha' - azodiisobutyronitrile. The emulsion is heated on a steam bath for 4 hours. At the end of this time the emulsion is broken and the precipitated copolymer is collected, washed, and dried in an oven at 70° C. for about 4 hours. A good yield of dry, white copolymer of styrene and benzyl dimethyl vinylphenyl ammonium bromide is obtained.

Example 14

To a reaction vessel, equipped with a reflux condenser, are charged 9 parts of methyl acrylate, 1 part of allyl dimethyl vinylphenyl ammonium bromide, 40 parts of water and 0.1 part of ammonium persulfate. The solution is refluxed for 4 hours on a steam bath. The product is collected on a Büchner funnel, washed with 100 parts of water and dried in an oven at 70° C. for 2 hours. A good yield of cream-colored, rubbery copolymer of methyl acrylate and allyl dimethyl vinylphenyl ammonium bromide is obtained.

Example 15

Samples of the homopolymeric acrylonitrile of Example 8 and of the acrylonitrile copolymers of Examples 9, 10, 11 and 12 are subjected to the following dye test:

A sample (5 parts) of the dry homopolymer or copolymer is added to a dye bath consisting of 500 parts of an aqueous solution containing 0.2 part of sulfuric acid, 1 part of sodium sulfate and 0.2 part of Calcocid Alizarine Blue SAPG (Color Index No. 1054). The dye bath is boiled for 30 minutes, after which the polymerization product is filtered off and washed with hot water until the water is free of dye. The acrylonitrile copolymers of Examples 9 to 12, inclusive, are dyed blue, whereas the homopolymeric acrylonitrile of Example 8 fails to absorb any dye. The advantage of modifying an acrylonitrile polymerization product by replacing a part, e.g., from about 2% to about 25% or 30% or more, still more particularly from 3 or 4% to 10 or 15%) of the initial acrylonitrile or other monomer with a quaternary ammonium compound of the kind embraced by Formula I, thereby to obtain a copolymeric substance of improved dyeability, is therefore quite apparent.

Example 16

A copolymer (more particularly a tripolymer) is prepared from 93 parts of acrylonitrile, 5 parts of methyl acrylate and 2 parts of benzyl dimethyl vinylphenyl ammonium bromide in essentially the same manner described under Example 11 with reference to the production of a copolymer of these same ingredients in slightly different proportions. This copolymer is dissolved in a concentrated aqueous solution of sodium thiocyanate (about 50% NaSCN in water) in proportions such as will yield a spinning solution containing about 9.4% of copolymer. This solution is filtered, placed under vacuum and allowed to deaerate for about 72 hours.

The aforementioned spinning solution is formed into a fiber by extruding it through a spinneret, having 40 holes 90 microns in diameter, into a coagulating bath comprising water maintained at a temperature of about 0° C. The spun fiber in gel state is continuously passed over a pair of converging wash rolls while it is advancing in a helical path. The fiber is rinsed with water on the rolls to remove excess thiocyanate. The washed fiber is stretched about 750% while passing through a bath of hot water maintained at a temperature of about 99.5° C., and then is taken up on a bobbin where it is kept in a gelled state by applying a fine spray of water while the fiber is being collected on the bobbin.

Individual swatches of the gelled fiber are bleached by bringing to a boil in 3% aqueous hydrogen peroxide, followed by water washing, then bringing to a boil in 35% nitric acid, and again washing with water. After drying at room temperature, the bleached swatches are dyed in the same manner as described under Example 15. The fibers are dyed to a deep shade of blue. In marked contrast, a fiber similarly prepared from homopolymeric acrylonitrile remains colorless when placed in the same dye bath for the same length of time.

It will be understood, of course, by those skilled in the art that my invention is not limited to the specific ingredients named in the above illustrative examples nor to the particular proportions and methods mentioned therein. Variations in starting materials, proportions, methods of preparation, etc., can obviously be made, as has been indicated in the portion of this specification prior to the examples.

Although many of the new copolymers of this invention, especially those containing a substantial proportion of acrylonitrile, are particularly useful in the formation of fibers or filaments which are more amenable to dyeing than homopolymeric acrylonitrile, these and the other copolymers of the invention also have numerous other applications in the plastics and coating arts. For instance, with or without a filler or other additive, they may be used as molding compositions (or as components of molding compositions) from which molded articles are produced by molding the compositions under heat and pressure, e.g., temperatures of the order of 130° C. or 140° C. to 200° C. and under pressures up to 10,000 pounds or more per square inch. Among the fillers that can be employed in the production of molded compositions are alpha-cellulose pulp, asbestos fibers, cotton flock, chopped cloth cuttings, glass fibers, wood flour, antimony oxide, titanium dioxide, sand, clay, mica dust, diatomaceous earth, etc.

The polymerizable compositions of my invention can be used in many different applications, for example as adhesives; in the treatment of paper or paper stock; in coating compositions; and for various other purposes. The polymer can be formed in situ after application of the monomer or mixture of monomers to the base material to be coated, impregnated or otherwise treated.

The unoriented and oriented fibers produced from my new fiber-forming copolymers are readily dyed, especially with an acid dye, while the fiber is in either a gel (e.g., aquagel) or a dry state. Such fibers or other shaped articles produced from the copolymers also have, in general, better antistatic properties than polymers in which no quaternary ammonium compound of the kind embraced by Formula I has been incorporated.

I claim:

1. A polymerizable composition comprising (1) a quaternary ammonium compound represented by the general formula

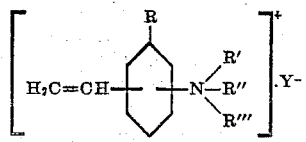

where R represents a member of the class consisting of hydrogen and the methyl radical, R' and R" each represents an alkyl radical containing from 1 to 5 carbon atoms, inclusive, R''' represents a radical of the class consisting of alkyl, alkenyl, hydroxyalkyl and aralkyl radicals and Y⁻ represents an anion, and (2) acrylonitrile.

2. A product comprising a copolymer of copolymerizable ingredients including (1) a quaternary ammonium compound represented by the general formula

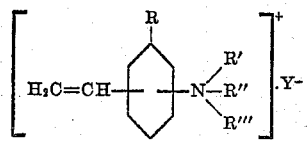

where R represents a member of the class consisting of hydrogen and the methyl radical, R' and R" each represents an alkyl radical containing from 1 to 5 carbon atoms, inclusive, R''' represents a radical of the class consisting of alkyl, alkenyl, hydroxyalkyl and aralkyl radicals, and Y⁻ represents an anion, and (2) acrylonitrile.

3. A product as in claim 2 wherein the quaternary ammonium compound of (1) is benzyl dimethyl vinylphenyl ammonium salt.

4. A product as in claim 2 wherein the copolymerizable ingredients additionally include (3) a substance which is different from the compounds of (1) and (2), is copolymerizable therewith and contains a single $CH_2=C<$ grouping, the acrylonitrile of (2) constituting more than 50% by weight of the total weight of (1), (2) and (3), the quaternary ammonium compound of (1) constituting from about 2% to about 30% by weight of the total weight of acrylonitrile and quaternary ammonium compound, and the substance of (3) constituting the remainder of the total amount of copolymerizable ingredients.

5. A product comprising a copolymer obtained by polymerization of a mixture of copolymerizable ingredients including (1) acrylonitrile and (2) a quaternary ammonium compound represented by the general formula

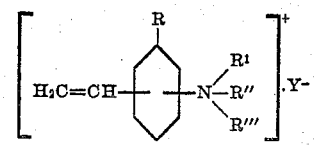

where R represents a member of the class consisting of hydrogen and the methyl radical, R' and R" each represents an alkyl radical containing from 1 to 5 carbon atoms, inclusive, R''' represents a radical of the class consisting of alkyl, alkenyl, hydroxyalkyl and aralkyl radicals, and Y⁻ represents an anion, the compound of (2) constituting from about 2% to about 40% by weight of the total amount of (1) and (2).

6. A product comprising an oriented fiber comprised of a copolymer obtained by polymerization of a mixture of copolymerizable ingredients including (1) acrylonitrile and (2) a quaternary ammonium compound represented by the general formula

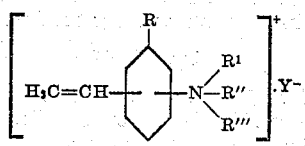

where R represents a member of the class consisting of hydrogen and the methyl radical, R' and R" each represents an alkyl radical containing from 1 to 5 carbon atoms, inclusive, R''' represents a radical of the class consisting of alkyl, alkenyl, hydroxyalkyl and aralkyl radicals, and Y⁻ represents an anion, the compound of (2) constituting from about 3% to about 30% by weight of the total amount of (1) and (2).

7. A product as in claim 6 wherein the quaternary ammonium compound of (2) is benzyl dimethyl vinylphenyl ammonium salt.

8. A composition comprising a copolymer of copolymerizable ingredients including acrylonitrile, benzyl dimethyl vinylphenyl ammonium salt and methyl acrylate.

9. A spinning solution comprised of a fiber-formable copolymer of copolymerizable ingredients including acrylonitrile, benzyl dimethyl vinylphenyl ammonium salt and methyl acrylate, said copolymer being dissolved in a concentrated aqueous solution of sodium thiocyanate.

10. A fiber-formable tripolymer obtained by polymerization of comerizable ingredients consisting of, by weight, 93% acrylonitrile, 5% methyl acrylate and 2% benzyl dimethyl vinylphenyl ammonium bromide.

11. A spinning solution comprised of the tripolymer of claim 10 dissolved in a concentrated aqueous solution of sodium thiocyanate.

References Cited in the file of this patent

UNITED STATES PATENTS

| | | |
|---|---|---|
| 2,609,392 | Crossley | Sept. 2, 1952 |
| 2,650,251 | Sprague | Aug. 25, 1953 |
| 2,654,779 | Price | Oct. 6, 1953 |
| 2,663,702 | Kropa | Dec. 22, 1953 |
| 2,676,952 | Ham | Apr. 27, 1954 |
| 2,677,679 | Barney | May 4, 1954 |
| 2,772,310 | Morris | Nov. 27, 1956 |
| 2,794,015 | Jackson et al. | May 28, 1957 |

FOREIGN PATENTS

| | | |
|---|---|---|
| 847,347 | Germany | Aug. 21, 1952 |

UNITED STATES PATENT OFFICE
CERTIFICATE OF CORRECTION

Patent No. 2,941,969            June 21, 1960

John A. Price

It is hereby certified that error appears in the printed specification of the above numbered patent requiring correction and that the said Letters Patent should read as corrected below.

Column 1, line 23, insert "(I)" before the formula; column 2, formula IV, lower right-hand portion should appear as shown below instead of as in the patent:

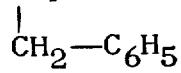

column 4, line 42, after "oxidation" insert a comma; line 47, for "formamide" read -- formamidine --; column 13, line 9, for "comerizable" read -- copolymerizable --.

Signed and sealed this 27th day of December 1960.

(SEAL)
Attest:
KARL H. AXLINE            ROBERT C. WATSON
Attesting Officer           Commissioner of Patents